United States Patent

[11] 3,585,850

[72] Inventor Jean Topart
    Colombes, France
[21] Appl. No. 793,484
[22] Filed Jan. 23, 1969
[45] Patented June 22, 1971
[73] Assignee Societe Pour La Mesure Des Calories
    "Somesca"
    La Garenne-Colombes, France
    a part interest
[32] Priority Feb. 15, 1968
[33] France
[31] 139915

[54] DEVICE FOR COUNTING HEAT OR COLD UNITS
    10 Claims, 6 Drawing Figs.
[52] U.S. Cl. .................................................. 73/193
[51] Int. Cl. .................................................. G01n 1/00
[50] Field of Search ........................................... 73/193, 190

[56] References Cited
    UNITED STATES PATENTS
    2,359,767 10/1944 Keinath .................. 73/193 X FOREIGN PATENTS
358,503 10/1931 Great Britain ............... 73/193
545,418 10/1922 France ....................... 73/193

Primary Examiner—Richard C. Queisser
Assistant Examiner—John K. Lunsford
Attorney—Wenderoth, Lind & Ponack ABSTRACT: Device for counting heat or cold units carried by a fluid and dissipated in a circuit passing through a heating or temperature-conditioning installation and comprising a fluid output meter. This device comprises an electric current meter, the inductor of which is energized by thermoelectric probe resistances immersed in the fluid at the inlet and outlet ends of the installation. The inductor of this electric current meter is energized only when a member adapted to deliver a current pulse each time the fluid output meter has performed a predetermined number of revolutions. The number of revolutions performed by the electric current meter is the product of its time of operation by the temperature difference between the thermoelectric probes.

JEAN TOPART, Inventor

By Wenderoth, Lind & Ponack
Attorneys

JEAN TOPART, Inventor

By Wenderoth, Lind & Ponack
Attorneys

DEVICE FOR COUNTING HEAT OR COLD UNITS

The present invention relates to devices for counting heat or cold units carried by a fluid and dissipated in a circuit passing through a heating or temperature-conditioning installation, these devices being based on the one hand on the fluid output given by an output meter and on the other hand on the temperature drop or increment of the fluid between the ingress and egress of said fluid into and from the installation.

Known apparatus proposed heretofore for performing this last measurement comprise as a rule two thermometric probes of the liquid-expansion type which measure by one the fluid temperature at the inlet and by the other the temperature of the same fluid at the outlet, a first mechanical device responsive to the difference between these two temperatures, another mechanical device adapted to periodically determine the product of this difference by the volume of water having passed through the fluid meter, and a counting mechanism for totalizing the various partial products thus obtained, said thermometric probes being connected to said first mechanical device by means of capillary tubes.

The foregoing prior art or known apparatus is characterized by the following inconveniences:

the capillary tubes are fragile and their length, which cannot exceed a few yards, cannot be increased in situ;

they are sometimes abnormally cumbersome;

their precision is insufficient in the case of small temperature differences;

in case of failure the complete unit must be replaced.

It is the essential object of this invention to avoid these various inconveniences. To this end, the present invention provides a device comprising a member capable of emitting a current pulse each time the fluid-output meter has performed a predetermined number of revolutions, a relay to which said current pulses are fed, a constant-speed electric motor constituting a time-base unit, thermoelectric probes having a resistance variable as a function of temperature which are immersed in the fluid at the inlet and outlet ends of the installation, a single-phase electric current meter of which the series windings are energized through said thermoelectric probe resistances, each current pulse being adapted to actuate said relay for on the one hand causing the rotation of said constant-speed motor and on the other hand energize said series windings for rotating said meter of which the number of revolutions is the product of its time of operation corresponding to the fluid output by the difference between the temperatures detected by said probes, another member actuated by said constant-speed motor after a predetermined time period for deenergizing said motor and causing said relay to resume its inoperative condition and thus deenergize said series windings of said electric current meter.

The various electrical component elements of this device are interconnected by conductors of any desired length and of conventional cross section.

This present inventive device is also characterized by the following advantageous features:

The electric meter can be located at any distance from the water meter and the thermoelectric probes; if desired, this electric meter can be mounted on a control board or grouped with other apparatus for performing similar functions, so as to facilitate the readings and inspections;

The electric meter of the conventional disc type may rotate in any direction at any speed, so that it is tamper-proof and protected against any possible interferences;

Since the limits of operation of the electric meter are extremely wide, like those of electric energy meters, the meter can record heat consumptions and more particularly the consumption of cold units taking place under very reduced temperature differences;

The fluid output meter, such as a watermeter, has the overall dimensions of conventional meters, since the pulse generator is substituted for the totalizer of these meters in the cases provided to this end.

It may also be noted that all the component elements of this device, such as the pulse generator, probes, electric meter, are strictly interchangeable and can be replaced by ordinary personnel, rapidly and without using special tools.

Now a typical form of embodiment of the device of this invention will be described by way of example with reference to the attached drawings, in which.

Figure 1:
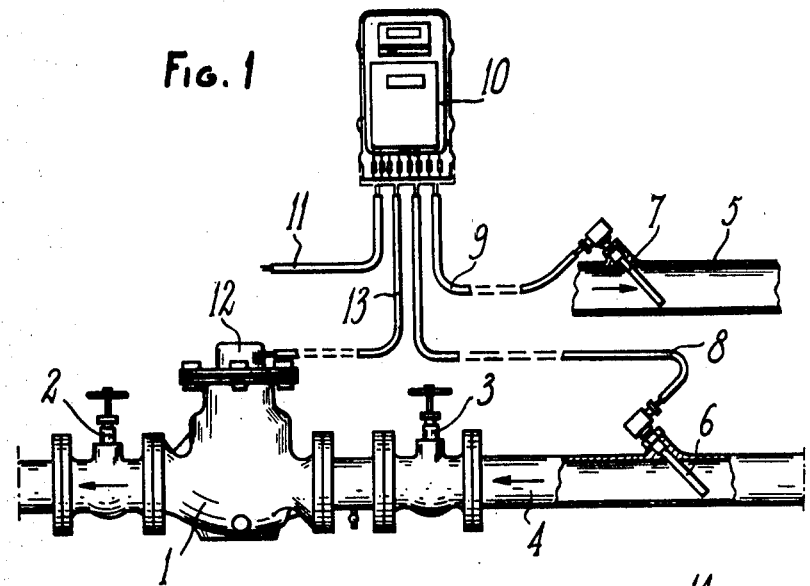
FIG. 1 is a general elevational view of the installation incorporating this device.

As illustrated in FIG. 1, the installation comprises as usual an output meter 1 which, in the example illustrated, is a watermeter. Valves 2 and 3 are of upstream and downstream of this meter, respectively. The water circulating for example through rooms for heating same is introduced into the installation in the hot state by means of a pipe section 5 and emerges therefrom via another pipe section 4, obviously at a lower temperature.

In these pipe sections 4 and 5 thermometric probes 6 and 7 are immersed, respectively, each probe incorporating an electrical resistor having preferably a high negative temperature coefficient (for example thermistors). These electric resistors are connected via conductors 8 and 9 to an electric current meter 10. This meter is connected in turn via conductors 11 to the mains and also by means of conductors 13 to the head 12 of watermeter 1, this head 12 being adapted, as will be explained presently, to deliver electric pulse each time the meter has performed a predetermined number of revolutions.

Figure 2:
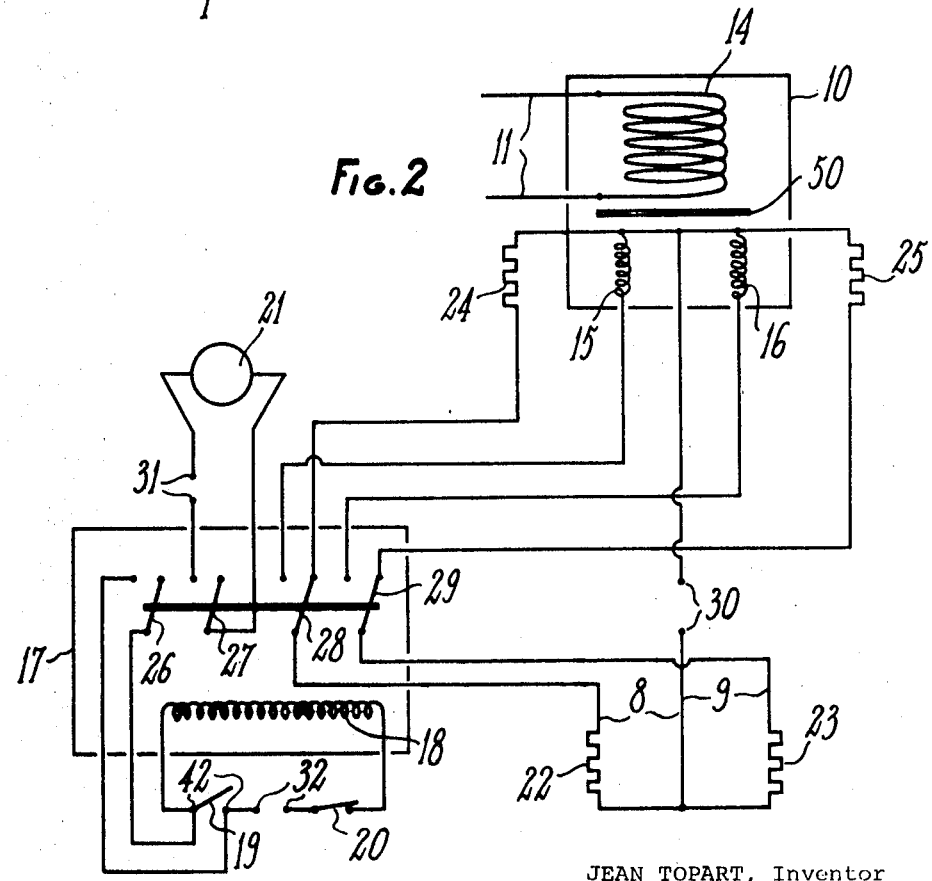
FIG. 2 is a wiring diagram of the device.

As illustrated in FIG. 2, the electrical section of the device comprises an electric meter 10 of the conventional disc type. Its voltage winding 14 is energized by the mains and its series winding consists of a pair of coils 15, 16 mounted in mutual opposition.

The electrical section further comprises a four-pole relay 17 having a winding 18 the energization of which is controlled by a pair of switches 19 and 20. Switch 19 is closed each time a current pulse is released from meter 1, and switch 20 is opened under the control of a small synchronous motor 21.

In FIG. 2 the reference numerals 22 and 23 denote the high-temperature coefficient resistors of probes 6 and 7 inserted into the inlet and outlet pipe sections 4 and 5 respectively. Moreover, reference numerals 24 and 25 designate resistors of same ohmic value as windings 15 and 16 respectively. The circuit of these resistors is energized from a low-voltage source connected at 30.

In the inoperative position, i.e. when the motor 21 is deenergized the four reversing contacts 26, 27, 28 and 29 of relay 17 are in the positions illustrated in FIG. 2, i.e. to the right; in the operative relay position these contacts are caused to engage their left-hand contacts. Besides, switch 19 is normally open and switch 20 is normally closed, except of course when they are actuated by current pulses respectively from the head 12 of meter 1 and from motor 21. This motor 21 is energized from the AC mains through terminals 31. Another pair of terminals 32 are connected to a source of low-voltage direct current (not shown).

The above-described device operates as follows:

When a current pulse is released from the watermeter, i.e. for a predetermined number of revolutions thereof, a pulse is delivered to the device by closing switch 19 which subsequently resumes its normal open position. Due to this pulse, the coil 18 of relay 17 is energized by the current flowing from the low-voltage source 32 and switches the contact arms 26, 27, 28 and 29 from their right-hand position to their left-hand position; as contact arm 26 is mounted in parallel with switch 19, the energization of coil 18 is maintained through switch 20 remaining closed notwithstanding the fact that switch 19 has been reopened.

The closing of contact arm 27 causes the synchronous motor 21 to be energized; the other two contact arms 28 and 29 close circuits for energizing coils 15 and 16 having resistors 22 and 23 mounted in series therewith. Thus, the electric meter 10 is started and its velocity of rotation is dependent on the values of said resistors 22 and 23 which are responsive in turn to the water temperatures at 4 and 5 respectively. Resistors 24 and 25 which, during the nonmeasuring periods, remain energized in series with resistors 22 and 23, maintain at a constant value the self-heating of said resistors 22 and 23.

When the synchronous motor 21 has performed a predetermined number of revolutions, i.e. after a predetermined time period, it opens the switch 20 and causes the deenergization of coil 18, thus restoring the reversing contact arms of relay 17 to their initial position. Thus, switch 20 resumes its closed position.

During the measurement, the number of revolutions performed by the meter 10 is the product of its time of operation (corresponding to the cubic meters recorded thereby) by the temperature difference between the two thermoelectric probes 6 and 7.

Now the device also constituting the subject-matter of this invention, which is adapted to deliver current pulses for controlling the operation of the above-described measuring device, will be described; this pulse-delivering device must on the one hand prevent switch 19 from remaining closed in case of zero output, i.e. when the meter 1 is stopped, and on the other hand in case the direction of flow of the water were reversed so as to cause the meter to rotate in the opposite direction.

This device comprises essentially an inertia weight adapted to pivot about a horizontal axis and to actuate said switch 19; this inertia weight is adapted to be moved away from its position of equilibrium (in which the switch is open) by a pin responsive to said watermeter and causing said switch to be closed only when the amplitude of this excursion attains a sufficient value, whereafter said inertia weight is released and resumes its position in which said switch is open. Instead of an inertia weight constituting a counterweight a spring producing a similar effect may be used.

Figure 3:
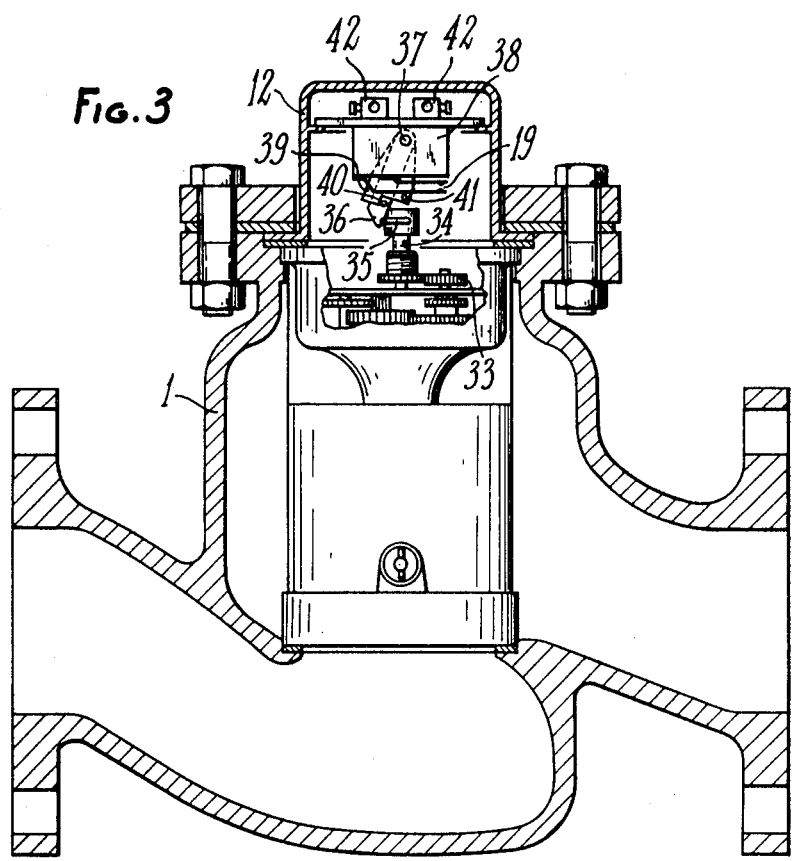
FIG. 3 is a cross-sectional view of the meter with the device actuated thereby for delivering electric pulses.

FIG. 3 illustrates a typical form of embodiment of a device of this character.

In this figure, the reference numeral 1 denotes the watermeter designed in the conventional fashion and comprising notably a train of reducing gears 33. The end shaft 34 of this train, which carries as usual the pointer and of which the number of revolutions has to be determined, projects into the head 12 bolted to the meter body. Secured to this shaft are one or a plurality of pins 35 adapted to engage a member 36 adapted to pivot freely about a pivot pin 37 carried by a mounting 38 rigid with the head 12. This member 36 carries a pin 40. The same pivot pin 37 may also be used for pivoting freely an inertia weight 39 carrying another pin 41 controlling the contacts of switch 19. Pin 40 of member 36 engages the inertia weight 39. The contact arms or blades of switch 19 are connected to terminals 42 of the wiring diagram of FIG. 2.

This arrangement operates as follows:

In the inoperative condition the contacts of switch 19 are open. During the rotation of the meter the pin 35 engages the member 36 to rotate same about the pivot pin 37 and at the same time the pin 40 of member 36 causes the inertia weight 39 to rotate. After a movement of a certain amplitude of the pin 35 the inertia weight 39 engages the lower contact arm of switch 19 to close the latter, thus providing the desired pulse, and at the same time the member 36 clears the pin 35 so as to restore the assembly to its initial condition.

If the meter 1 were caused to rotate in the opposite direction, the same process would take place and the pin or pins 35 would carry along the member 36 in the opposite direction. In this case this member 36 would not carry along the inertia weight 39 and therefore no current pulse would be produced.

Figure 4:
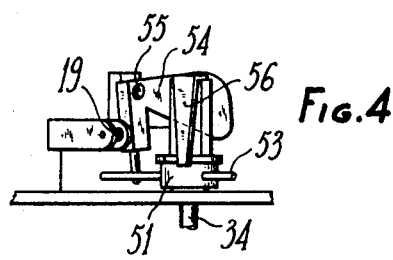
FIG. 4 is a modified form of embodiment of this device.
Figure 5:
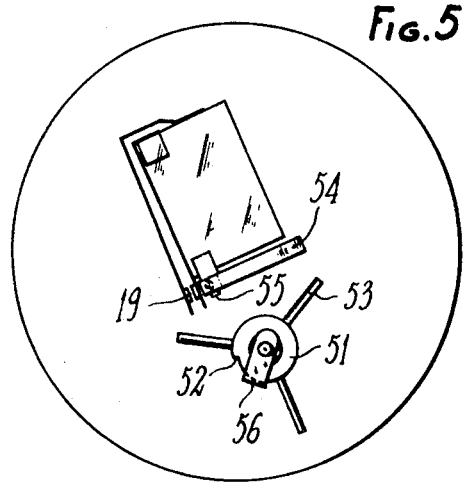
FIG. 5 is a plane view of the device of FIG. 4.

According to another form of embodiment illustrated in FIGS. 4 and 5 of the drawings, a cam 51 formed with a notch 52 is mounted on shaft 34 and adapted to rotate freely in one or the other direction about this shaft. This cam carries radial pins 53 adapted to engage an inertia weight 54 pivotally mounted at 55 to a fixed member. A spring 56 is mounted on shaft 34 and revolves therewith. When this shaft 34 rotates in the normal direction, the spring 56 engages the notch 52 and drives the cam 51 and therefore the inertia weight 54. The latter engages the contacts of switch 19 to close the latter. In contrast thereto, when the shaft revolves in the other direction the spring clears the notch and the cam remains stationary.

The cutoff device adapted to allow current to flow during a strictly constant time through the thermoelectric probes 22 and 23 and the current windings 15 and 16 of the electric meter, is constructed as described hereinafter. This device, which is particularly simple and extremely accurate, operates in a manner similar to the device producing current pulses from the watermeter.

Figure 6:
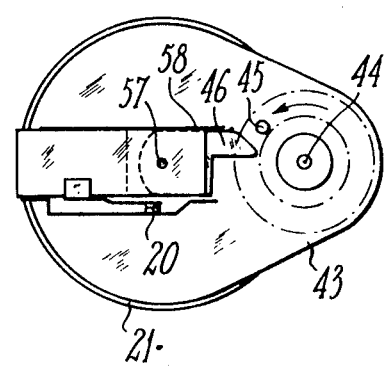
FIG. 6 is an elevational view of the device for stopping the constant-speed motor.

FIG. 6 shows a synchronous motor 21 equipped with a reducing gear 43 and an output shaft 44. One or a plurality of pins 45 are secured to this shaft and adapted to engage a member 46 revolving about a shaft 57 and acting upon a switch 20.

In the inoperative condition switch 20 is closed, member 46 being urged by a spring 58 to its normal position. During the rotation of motor 21 the pin or pins 45 carry along the member 46 and stress the spring 58. Thus, the contacts of switch 20 are opened and immediately thereafter as the pin 45 has cleared the member 46 the latter resumes its initial position under the control of spring 58. Switch 20 remains open during a time sufficient to deenergize the coil 18 of relay 17.

In an alternate form of embodiment an inertia weight of the type described hereinabove in the case of a device delivering pulses from the meter is substituted for the spring.

The electric meter 10 is a single-phase meter having its current winding modified as explained hereinabove and its magnet removed so that its reading will be independent of voltage variations in the mains. The braking force balancing the motor torque is provided by eddy currents produced in the disc 50 by coil 14, the usual magnetic gap being increased accordingly.

This meter or rather the motor thereof may be housed with the various ancillary elements of the device (transformer, relay, synchronous motor with reducing gear and cutoff means) in a case or more simply in a three-phase meter case.

The velocity of rotation of the disc of the electric meters, as a function of the difference of the temperatures involved, is made identical for all the meters by using conventional meter adjustment means, so that these meters become interchangeable.

Accessorily, the water output flowing through the watermeter may be recorded by a counting mechanism driven either mechanically from the reduction gear of the synchronous motor or electrically from an energizing coil.

The thermoelectric probes 22 and 23 utilized in this device may be of any suitable or ordinary type. Their self-heating characteristic may be neutralized or rendered negligible by using conventional heat-dissipating methods. If these probes are of the negative temperature coefficient resistor type, wherein the tolerances as to temperature ratings and coefficients are particularly important, the interchangeability of probes 22—23 is obtained, in the range o operation contemplated for the device of this invention, by connecting in series and in parallel with said resistors other fixed resistors of adequate ohmic values.

Various modifications may be brought to the mounting of these probes. Thus, for example, a transformer having its primary windings mounted in opposition (one for each probe) may be used, the secondary of this transformer energizing the electric meter windings 15 and 16, this arrangement permitting of utilizing a milliammeter showing the difference between the temperatures involved.

Of course, this invention should not be construed as being limited by the specific forms of embodiment illustrated and described herein, since many modifications and variations may be brought thereto without departing from the spirit and scope of the invention as set forth in the appended claims.

What I claim is:

1. A device for counting heat units or cold units conveyed by a fluid and dissipated in a circuit passing through a heating or temperature-conditioning installation, which device comprises a fluid output meter, a first member adapted to delver a current pulse each time said fluid output meter has performed a predetermined number of revolutions, a relay, circuit means for applying said current pulses to the winding of said relay, a constant-speed electric motor adapted to act as a time base, a pair of thermoelectric probes having each a resistance varying as a function of temperature, which are immersed in said fluid at the inlet and outlet ends of said installation respectively, a single-phase electric meter having its series windings adapted to be energized through said variable-resistance probes, the energization of said relay by said pulses being adapted on the one hand to control the rotation of said constant-speed motor and, on the other hand, to energize said series windings for rotating said electric meter, whereby the number of revolutions of said meter are the product of its time of operation corresponding to the fluid output by the temperature difference detected by said probes, another member driven from said constant-speed motor after a predetermined time period for deenergizing said motor and causing said relay to resume its inoperative condition, whereby said relay will deenergize the series windings of said electric meter.

2. A device as set forth in claim 1, wherein said electric meter is of the rotatable disc type having a voltage winding supplied from the mains and a pair of series windings each supplied through the resistor of one of said thermoelectric probes.

3. A device as set forth in claim 2, wherein, outside the measuring time periods said thermoelectric probe resistors are connected in series each with a resistor of said ohmic value as the corresponding series windings of said electric meter.

4. A device as set forth in claim 1, wherein said thermoelectric probe resistors have a high negative temperature coefficient.

5. A device for counting heat units or cold units conveyed by a fluid and dissipated in a circuit passing through a heating or temperature-conditioning installation, which device comprises a fluid output meter having a rotatable output shaft; a first member adapted to deliver a current pulse each time said fluid output meter shaft has performed a predetermined number of revolutions; said first member comprising at least one pin rigid with said meter output shaft; a relay including an electrical winding; circuit means for applying said current pulses to the winding of said relay, said circuit means including a switch, an oscillating member adapted to be driven from said shaft-connected pin to actuate said switch in the relay winding energizing circuit; a constant-speed electric motor adapted to act as a time base; a pair of thermoelectric probes having each a resistance varying as a function of temperature, which are immersed in said fluid at the inlet and outlet ends of said installation respectively; a single-phase electric meter having its series windings adapted to be energized through said variable-resistance probes; the energization of said relay by said pulses being adapted on the one hand to control the rotation of said constant-speed motor, and on the other hand, to energize said series windings for rotating said electric meter, whereby the number of revolutions of said meter shaft are the product of its time of operation corresponding to the fluid output by the temperature difference detected by said probes; and another member driven from said constant-speed motor after a predetermined time period for deenergizing said motor and causing said relay to resume its inoperative condition, whereby said relay will deenergize the series windings of said electric meter.

6. A device as set forth in claim 5, wherein said pivoting member is adapted to close the relay winding energizing circuit after a predetermined angular excursion of said pin and to resume its inoperative position by gravity.

7. A device as set forth in claim 5, wherein said pivoting member is adapted to be restored to its inoperative position by a spring after having closed the energizing circuit of said relay winding.

8. A device for counting heat units or cold units conveyed by a fluid and dissipated in a circuit passing through a heating or temperature-conditioning installation, which device comprises a fluid output meter; a first member adapted to deliver a current pulse each time said fluid output meter has performed a predetermined number of revolutions; a relay having an electrical winding; circuit means including a switch for applying said current pulses to the winding of said relay; a constant-speed electric motor adapted to act as a time base; a pair of thermoelectric probes having each a resistance varying as a function of temperature, which are immersed in said fluid at the inlet and outlet ends of said installation, respectively; a single-phase electric meter having its series windings adapted to be energized through said variable-resistance probes; the energization of said relay by said pulses being adapted on the one hand to control the rotation of said constant-speed motor and, on the other hand, to energize said series windings for rotating said electric meter, whereby the number of revolutions of said meter are the product of its time of operation corresponding to the fluid output by the temperature difference detected by said probes; another member driven from said constant-speed motor after a predetermined time period for deenergizing said motor and causing said relay to resume its inoperative condition, whereby said relay will deenergize the series windings of said electric meter, and wherein said member adapted to be driven from said constant-speed motor for deenergizing said motor and to restore said relay to its deenergized condition comprises at least one pin driven from said motor and an oscillating inertia weight responsive to said pin and adapted to actuate said switch inserted in the relay winding energizing circuit.

9. A device as set forth in claim 8, wherein said oscillating weight is adapted to open said relay winding energizing circuit when said pin has accomplished a predetermined angular excursion and to resume its inoperative position by gravity.

10. A device as set forth in claim 8, wherein spring means are provided for restoring, said oscillating weight to its inoperative position.